(12) United States Patent
Hwang et al.

(10) Patent No.: US 12,661,793 B2
(45) Date of Patent: Jun. 23, 2026

(54) ELECTRONIC DEVICE FOR COOPERATIVE OPERATION OF A PLURALITY OF ROBOT DEVICES AND CONTROLLING METHOD THEREOF

(71) Applicant: SAMSUNG ELECTRONICS CO., LTD., Suwon-si (KR)

(72) Inventors: Sangyoung Hwang, Suwon-si (KR); Woomok Kim, Suwon-si (KR); Boseok Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/744,132

(22) Filed: Jun. 14, 2024

(65) Prior Publication Data

US 2025/0001604 A1     Jan. 2, 2025

Related U.S. Application Data

(63) Continuation of application No. PCT/KR2024/005356, filed on Apr. 19, 2024.

(30) Foreign Application Priority Data

Jun. 30, 2023     (KR) ........................ 10-2023-0084899

(51) Int. Cl.
    *B25J 9/16*        (2006.01)
    *B25J 19/06*     (2006.01)
    (Continued)
(52) U.S. Cl.
    CPC .......... *B25J 9/1676* (2013.01); *B25J 19/061* (2013.01); *G05D 1/2462* (2024.01); *G05D 1/689* (2024.01)

(58) Field of Classification Search
    CPC ........ B25J 9/1676; B25J 9/1674; B25J 9/161; B25J 9/1664; B25J 9/1682; B25J 5/00;
        (Continued)

(56) References Cited

U.S. PATENT DOCUMENTS 11,260,525 B2    3/2022  Lee
11,642,798 B2    5/2023  Kwak et al.
        (Continued)

FOREIGN PATENT DOCUMENTS

CN      108829087 A    11/2018
CN      111352425 A  *  6/2020  ........... G01C 21/005
        (Continued)

OTHER PUBLICATIONS

International Search Report (PCT/ISA/210) issued by the International Searching Authority on Jul. 22, 2024 in corresponding International Application No. PCT/KR2024/005356.

(Continued)

*Primary Examiner* — Nhi Q Bui
(74) *Attorney, Agent, or Firm* — Sughrue Mion, PLLC

(57) ABSTRACT

An electronic device is provided. The electronic device includes a communication interface and one or more processors configured to receive operation information of each of a plurality of robot devices through the communication interface, identify at least one first robot device from among the plurality of robot devices as a target device based on a plurality of pieces of operation information, control at least one robot device so that the at least one robot device from among the remaining robot devices monitors the target device, based on monitoring data being received from the at least one robot device that monitors the target device, identify whether an operation of the target device according to the operation is safe based on the monitoring data, and (Continued)

transmit a command for controlling the target device to the target device based on a result of the identification.

20 Claims, 10 Drawing Sheets

(51) Int. Cl.
  *G05D 1/246*      (2024.01)
  *G05D 1/689*      (2024.01)

(58) Field of Classification Search
  CPC . B25J 19/06; B25J 19/02; B25J 13/006; B25J 13/08; G05D 2105/28; G05D 2107/70; G05D 2109/10; G05D 1/2462; G05D 1/689; G05D 1/225; G05D 1/6987; G05D 1/617
  See application file for complete search history.

(56) References Cited

U.S. PATENT DOCUMENTS

| | | | |
|---|---|---|---|
| 12,214,503 B2 | 2/2025 | Higuchi | |
| 2020/0023511 A1* | 1/2020 | Lee | B25J 9/0084 |
| 2020/0150685 A1* | 5/2020 | Kim | G05D 1/0289 |
| 2021/0060801 A1 | 3/2021 | Kwak et al. | |
| 2021/0069901 A1* | 3/2021 | Oda | G05B 19/41895 |
| 2021/0256709 A1* | 8/2021 | Madden | H04N 7/186 |
| 2022/0267102 A1 | 8/2022 | Ishida | |
| 2022/0291685 A1 | 9/2022 | Inacio De Matos | |
| 2024/0264611 A1 | 8/2024 | Kim et al. | |

FOREIGN PATENT DOCUMENTS

| | | | | |
|---|---|---|---|---|
| JP | 2004-291186 A | 10/2004 | | |
| JP | 4671628 B2 | 4/2011 | | |
| JP | 2022-127886 A | 9/2022 | | |
| KR | 10-1692602 B1 | 1/2017 | | |
| KR | 10-2019-0106864 A | 9/2019 | | |
| KR | 10-2019-0108087 A | 9/2019 | | |
| KR | 10-2141320 B1 | 8/2020 | | |
| KR | 10-2021-0044598 A | 4/2021 | | |
| KR | 102315362 B1 * | 10/2021 | | B25J 9/1602 |
| KR | 10-2023-0076507 A | 5/2023 | | |
| WO | 2018/221053 A1 | 12/2018 | | |
| WO | 2021/044953 A1 | 3/2021 | | |
| WO | 2022/199856 A1 | 9/2022 | | |

OTHER PUBLICATIONS

Written Opinion (PCT/ISA/237) issued by the International Searching Authority on Jul. 22, 2024 in corresponding International Application No. PCT/KR2024/005356.
Communication issued on Apr. 22, 2026 by the European Patent Office in European Patent Application No. 24832200.0.

* cited by examiner

① DETECT LOADING STATE OF TARGET
DEVICE USING DETECTION DEVICE

② IDENTIFY OPERATION OF
ROBOT DEVICE AS UNSAFE

FIG. 10

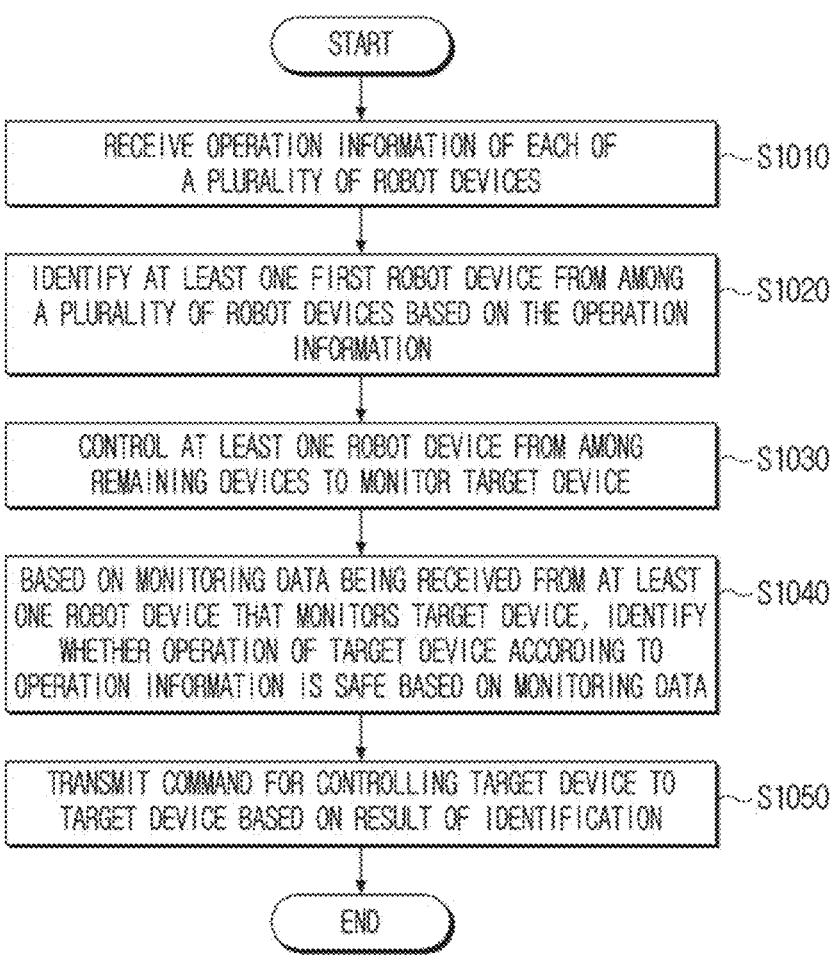

START

RECEIVE OPERATION INFORMATION OF EACH OF A PLURALITY OF ROBOT DEVICES ~S1010

IDENTIFY AT LEAST ONE FIRST ROBOT DEVICE FROM AMONG A PLURALITY OF ROBOT DEVICES BASED ON THE OPERATION INFORMATION ~S1020

CONTROL AT LEAST ONE ROBOT DEVICE FROM AMONG REMAINING DEVICES TO MONITOR TARGET DEVICE ~S1030

BASED ON MONITORING DATA BEING RECEIVED FROM AT LEAST ONE ROBOT DEVICE THAT MONITORS TARGET DEVICE, IDENTIFY WHETHER OPERATION OF TARGET DEVICE ACCORDING TO OPERATION INFORMATION IS SAFE BASED ON MONITORING DATA ~S1040

TRANSMIT COMMAND FOR CONTROLLING TARGET DEVICE TO TARGET DEVICE BASED ON RESULT OF IDENTIFICATION ~S1050

END

ELECTRONIC DEVICE FOR COOPERATIVE OPERATION OF A PLURALITY OF ROBOT DEVICES AND CONTROLLING METHOD THEREOF

CROSS-REFERENCE TO RELATED APPLICATIONS

This application is a bypass continuation of International Application No. PCT/KR2024/005356, filed on Apr. 19, 2024, which is based on and claims priority to Korean Patent Application No. 10-2023-0084899, filed on Jun. 30, 2023, in the Korean Intellectual Property Office, the disclosures of which are incorporated by reference herein in their entireties.

FIELD

This disclosure relates to an electronic device and a controlling method thereof and more particularly, to an electronic device that controls a plurality of robot devices for a cooperative operation between the plurality of robot devices, and a controlling method thereof.

DESCRIPTION OF THE RELATED ART

Recently, robot devices have been rapidly distributed in various fields, and not only are robot devices replacing the roles of humans, but recently, unmanned factories (or smart factories) that operate only with robot devices without humans have rapidly increased in number.

If individual robot devices travel and operate autonomously, a higher level of safety is required then when controlled by humans.

In order to allow for a robot device to monitor its own surrounding environment and operate safely in consideration of potential risks in the monitored surrounding environment, the number of sensors that the robot device must have has rapidly increased. For example, with only a limited number of sensors, it is difficult to thoroughly monitor the surrounding environment of the robot device, and there is a risk of blind spots occurring.

If a safety-related accident occurs in a blind spot that the robot device cannot monitor, it may lead to a serious accident.

When the number of sensors that a robot device must be equipped with increases, the manufacturing cost of the robot device may increase rapidly, and even with multiple sensors, it may be practically impossible to perfectly monitor the surrounding environment without blind spots.

Accordingly, is a demand for a method of monitoring the surrounding environment without blind spots while ensuring a high level of safety and without increasing the number of sensors that each robot device must have by performing a cooperative operation between robot devices located in a space such as a factory.

SUMMARY

According to an aspect of the disclosure, an electronic device includes: a communication interface; at least one memory storing one or more instructions; and one or more processors in communication with the at least one memory, wherein the one or more instructions, when executed by the one or more processors, cause the electronic device to: receive, through the communication interface, operation information of each of a plurality of robot devices, identify at least one first robot device from among the plurality of robot devices as a target device based on the operation information, control, through the communication interface, at least one second robot device from among the plurality of robot devices to monitor the target device, and based on receiving monitoring data from the at least one second robot device through the communication interface: identify whether an operation of the target device is safe based on the monitoring data, and transmit, through the communication interface, a command to the target device based on a result of the identification of the operation of the target device.

The at least one memory stores information related to a hazardous operation, and the one or more processors further configured to: based on the operation of the at least one first robot device comprising the hazardous operation based on the information related to the hazardous operation, identify the at least one first robot device as the target device.

The at least one memory stores map information corresponding to a space in which the plurality of robot devices are located, the map information comprises hazardous region information, and the one or more processors are further configured to: receive, through the communication interface, location information regarding each of the plurality of robot devices, and based on identifying a location of the at least one first robot device as being in a hazardous region based on the hazardous region information and the location information, identify the at least one first robot device as the target device.

The one or more processors are further configured to: identify the at least one second robot device based on identifying that the at least one second robot device is located within a threshold distance of the target device based on the location information.

The monitoring data comprises at least one of photographic data of the target device, velocity data of the target device, or location data of the target device.

The one or more processors are further configured to: based on identifying that a predetermined object is located within a threshold distance of the target device based on the photographic data or identifying that a loading state of an object loaded on the target device is defective based on the photographic data, identify the operation of the target device as unsafe, and transmit, through the communication interface, the command to the target device based on identifying that the operation of the target device is unsafe.

The one or more processors are further configured to: based on a traveling speed of the target device being equal to or greater than a threshold speed based on the velocity data or the target device being located in a hazardous region based on the location data, identify the operation of the target device as unsafe, and transmit, through the communication interface, the command to the target device based on identifying that the operation of the target device is unsafe.

The operation information comprises, for each respective robot device of the plurality of robot devices, information regarding an operation of the respective robot device, information identifying whether the operation of the respective robot device is performed, and a traveling path of the respective robot device, and the one or more processors are further configured to: identify the at least one second robot device based on identifying that the at least one second robot device is in an idle state based on the operation information, transmit, through the communication interface, a command to the at least one second robot device which causes the at least one second robot device to follow the target device, and identify whether the operation of the target device is safe based on the monitoring data.

The one or more processors are further configured to: receive, through the communication interface, location information regarding each of the plurality of robot devices, identify, based on the location information, the at least one second robot device based on identifying that the at least one second robot device is adjacent to and within a threshold distance of the target device, control, through the communication interface, the target device to monitor the at least one second robot device, and based on receiving first monitoring data from the target device through the communication interface: identify whether an operation of the at least one second robot device is safe based on the first monitoring data, and transmit, through the communication interface, a command to the at least one second robot device.

The command comprises an instruction causing the target device to output a warning sound.

A method of controlling an electronic device, the method comprising: receiving operation information of each of a plurality of robot devices, identifying at least one first robot device from among the plurality of robot devices as a target device based on the operation information, controlling at least one second robot device from among the plurality of robot devices to monitor the target device and based on receiving monitoring data from the at least one second robot device: identifying whether an operation of the target device is safe based on the monitoring data and transmitting a command to the target device based on a result of the identification of the operation of the target device.

The identifying the at least one first robot device as the target device further comprises, based on the operation of the at least one first robot device corresponding to a hazardous operation based on information related to the hazardous operation, identifying the at least one first robot device as the target device.

The method further comprises receiving location information regarding each of the plurality of robot devices, the identifying the at least one first robot device as the target device further comprises, based on identifying a location of the at least one first robot device as being in a hazardous region based on hazardous region information and the location information, identifying the at least one first robot device as the target device and the transmitting the command further comprises transmitting an instruction causing the target device to stop the operation of the target device or to output a warning sound.

The method further comprises identifying the at least one second robot device based on identifying that the at least one second robot device is located within a threshold distance of the target device based on the location information.

The monitoring data comprises at least one of photographic data of the target device, velocity data of the target device, or location data of the target device.

A system comprises: an electronic device comprises a communication interface, at least one memory storing one or more instructions and one or more processors in communication with the at least one memory and a plurality of robot devices, each robot device of the plurality of robot devices comprises at least one sensor, the one or more processors are further configured to: receive, through the communication interface, operation information of each of the plurality of robot devices, identify a first robot device from among the plurality of robot devices as a target device based on the operation information, control, through the communication interface, a second robot device from among the plurality of robot devices to monitor the target device, and based on receiving monitoring data from the second robot device through the communication interface: identify whether an operation of the target device is safe based on the monitoring data, and transmit, through the communication interface, a command to the target device based on a result of the identification of the operation of the target device.

The at least one memory stores information related to a hazardous operation and hazardous region information corresponding to a space in which the plurality of robot devices are located, and the one or more processors are further configured to: receive, through the communication interface, location information regarding each of the plurality of robot devices, and identify the first robot device as the target device based on: identifying the operation of the first robot device as comprising the hazardous operation based on the information related to the hazardous operation, or identifying a location of the first robot device as being in a hazardous region based on the hazardous region information and the location information.

The one or more processors are further configured to: receive, through the communication interface, location information regarding each of the plurality of robot devices, and identify the at least one second robot device based on identifying that the at least one second robot device is located within a threshold distance of the target device based on the location information.

The monitoring data comprises at least one of photographic data of the target device, velocity data of the target device, or location data of the target device.

The operation information comprises, for each respective robot device of the plurality of robot devices, information regarding an operation of the respective robot device, information identifying whether the operation of the respective robot device is performed, and a traveling path of the respective robot device, and the one or more processors are further configured to: identify the at least one second robot device based on identifying that the at least one second robot device is in an idle state based on the operation information, transmit, through the communication interface, a command to the at least one second robot device which causes the at least one second robot device to follow the target device, and identify whether the operation of the target device is safe based on the monitoring data.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10 is a flowchart provided to explain a controlling method of an electronic device according to an embodiment.

DETAILED DESCRIPTION

Figure 1:
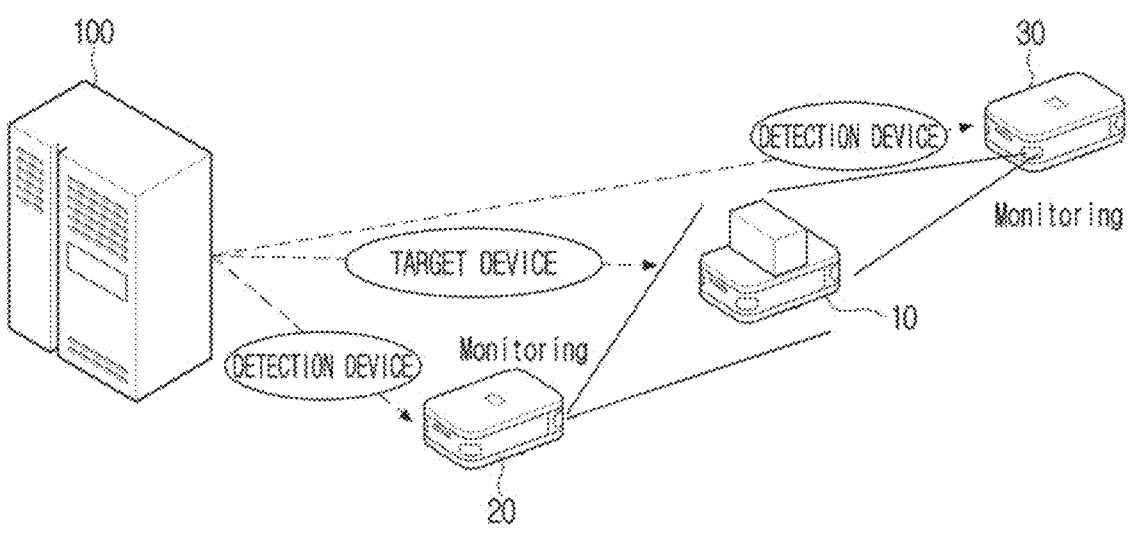
FIG. 1 is a diagram provided to explain an operation between an electronic device and a plurality of robot devices according to an embodiment.

Hereinafter, the disclosure is described in detail with reference to the accompanying drawings.

General terms are selected in describing one or more embodiments of the disclosure in consideration of their functions in the disclosure, and may be changed based on the intention of those skilled in the art or a judicial precedent, the emergence of a new technique, or the like. Where terms are arbitrarily chosen by an applicant to have a specific meaning, the meaning of such terms is mentioned in detail in corresponding descriptions of the disclosure. Where appropriate, the terms used in the disclosure should be defined on the basis of the specific meaning of the terms and the context of the disclosure.

In the disclosure, an expression "have", "may have", "include", "may include" or the like, indicates the existence of a corresponding feature (for example, a numerical value, a function, an operation or a component such as a part), and does not exclude the existence of an additional feature.

As used herein, expressions such as "at least one of A and B" and "at least one of A or B" may indicate either "A" or "B", or "both of A and B."

Expressions "first", "second", and the like, used in the disclosure may indicate various components regardless of the sequence or importance of the components. These expressions are used only to distinguish one component from another component, and do not limit the corresponding components.

In case that any component (for example, a first component) is mentioned to be "(operatively or communicatively) coupled with/to" or "connected to" another component (for example, a second component), it is to be understood that any component is directly coupled to another component or may be coupled to another component through still another component (for example, a third component).

A term of a singular number may include its plural number unless explicitly indicated otherwise in the context. It is to be understood that a term "include", "formed of", or the like used in the application specifies the presence of features, numerals, steps, operations, components, parts, or combinations thereof, mentioned in the specification, and does not preclude the presence or addition of one or more other features, numerals, steps, operations, components, parts, or combinations thereof.

In the embodiments described herein, a "module" or a "~er/or" may perform at least one function or operation, and may be implemented by hardware or software, or may be implemented by a combination of hardware and software. In addition, a plurality of "modules" or a plurality of "~ers/ors" may be integrated in at least one module and implemented by at least one processor except for a "module" or an "~er/or" that needs to be implemented by specific hardware.

In the present disclosure, the term "user" may refer to a person using an electronic device or an apparatus using an electronic device (e.g., an artificial intelligence electronic device).

Hereinafter, various embodiments will be described in greater detail with reference to the accompanying drawings.

FIG. 1 is a view provided to explain an operation between an electronic device and a plurality of robot devices according to an embodiment.

An electronic device 100 according to an embodiment performs communication with a plurality of robot devices 10, 20, 30, and may transmit/receive various data to/from the plurality of robot devices 10, 20, 30.

For example, the electronic device 100 may receive operation information from each of the plurality of robot devices 10, 20, 30.

Here, each of a plurality of pieces of operation information received by the electronic device 100 may indicate a current state of a corresponding robot device.

For example, the operation information may include the operation (or task) being performed by a robot device, the total time (or time spent) required for a corresponding operation, the elapsed time and remaining time after starting the corresponding operation, a movement path (or a traveling path) of a robot device when the corresponding operation requires the movement of the robot device, etc.

Here, the operation that is being performed by the robot device may include a specific operation name (e.g., an object transporting operation, an object gripping operation, etc.), whether each of a plurality of components included in the robot device is driven, a level of load, etc.

For example, when the robot device includes an actuator consisting of a wheel, a break, a motor, etc., the operation information of the robot device may include whether the actuator operates, the operating direction of the actuator, the operating speed, the level of load, etc.

For example, when the robot device includes a robot joint that performs a function similar to the function of a human arm or finger, the operation information of the robot device may include whether the robot joint operates, the operating direction, the operating speed, the level of load, etc.

According to an embodiment, in order to comply with safety regulations and prevent accidents, the robot device may monitor the surrounding environment of the robot device through various sensors provided in the robot device, stop (or pause) the operation based on the monitored surrounding environment, adjust the speed of performing the operation (e.g., change the traveling speed), or change the method of performing the operation (e.g., change the traveling path).

However, there is a limit to how much of the surrounding environment the robot device is able to monitor using only a sensor provided within the robot device, and there are some areas that cannot be monitored by the sensor (e.g., a blind spot of the robot device) causing accidents, or there is a problem in that the manufacturing costs of the robot device increase as the number of sensors increases.

The electronic device 100 according to an embodiment may identify at least one robot device as a target device based on operation information of each of a plurality of robot devices 10, 20, 30, monitor the surrounding environment of the target device more accurately while the target device performs an operation by controlling the at least one robot device from among the remaining robot devices to monitor (or detect) the target device, and control the target device not to cause an accident (or to comply with safety regulations) while the target device performs an operation based on the monitoring data received from the at least one robot device that monitors the target device.

Figure 2:
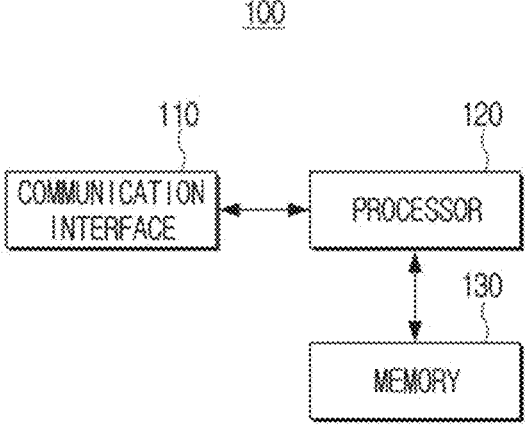
FIG. 2 is a block diagram provided to explain an electronic device according to an embodiment.

A detailed description regarding the above will be provided with reference to FIG. 2.

FIG. 2 is a block diagram provided to explain an electronic device according to an embodiment.

Referring to FIG. 2, the electronic device 100 may include a communication interface 110, one or more processors 120, and one or more memory modules 130.

For convenience of explanation, the electronic device 100 according to an embodiment is assumed as a server capable of communicating with a plurality of robot devices 10, 20, 30, but is not limited thereto. For example, The electronic device 100 according to an embodiment may include at least one of TVs, user terminal devices, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, medical devices, cameras, virtual reality (VR) implementation devices, or wearable devices. Here, the wearable device may include at least one of an accessory type of a device (e.g., a timepiece, a ring, a bracelet, an anklet, a necklace, glasses, a contact lens, or a head-mounted-device (HMD)), one-piece fabric or clothes type of a circuit (e.g., electronic clothes), a body-attached type of a circuit (e.g., a skin pad or a tattoo), or a bio-implantable type of a circuit. According to one or more embodiments, the electronic device 100 may include at least one of televisions (TVs), digital versatile disc (DVD) players, audios, refrigerators, air-conditioners, cleaners, ovens, microwave ovens, washing machines, air cleaners, source devices (e.g., set-top boxes), cloud servers, Over-the-top (OTT) services, home automation control panels, security control panels, media boxes (e.g., Apple TV™ or Google TV™), LED S-Box, game consoles (e.g., Xbox™, PlayStation™, or Nintendo Switch™), electronic dictionaries, electronic keys, camcorders, electronic picture frames, or the like.

According to another embodiment, the electronic device 100 may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices, etc.), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, drones, automatic teller's machines (ATMs) of banking institutions, points of sales (POSs) of stores, or internet of things (e.g., light bulbs, various sensors, sprinkler devices, fire alarms, thermostats, street lamps, toasters, exercise equipment, hot water tanks, heaters, boilers, and the like).

The communication interface 110 provided in the electronic device 100 may communicate with an external device (e.g., robot devices, etc.), a server, etc. to receive various types of data and information. For example, the communication interface 110 may receive various types of data and information from an external device, an external storage medium (e.g., a USB memory), a server (e.g., a web hard drive), etc. through communication methods such as AP-based Wi-Fi (Wireless LAN Network), Bluetooth, Zigbee, wired/wireless Local Area Network (LAN), Wide Area Network (WAN), Ethernet, IEEE 1394, High-Definition Multimedia Interface (HDMI), Universal Serial Bus (USB), Mobile High-Definition Link (MHL), Audio Engineering Society/European Broadcasting Union (AES/EBU), Optical, Coaxial, etc.

In particular, the communication interface 110 may receive operation information, monitoring data, etc. from the robot device under the control of one of more processors 120, and transmit a command to the target device.

The one or more processors 120 according to an embodiment controls the overall operations of the electronic device 100.

The one or more processors 120 according to an embodiment may be implemented as a digital signal processor (DSP), a microprocessor, or a Time controller (TCON) that processes a digital image signal. However, the one or more processors 120 are not limited thereto, and may include one or more of a central processing unit (CPU), a Micro Controller Unit (MCU), a micro processing unit (MPU), a controller, an application processor (AP), a communication processor (CP), an advanced RISC machine (ARM) processor, or an artificial intelligence processor, or may be defined by this term. In addition, the one or more processors 120 may be implemented in a system-on-chip (SoC) or a large scale integration (LSI) in which a processing algorithm is embedded, or may be implemented in the form of a field programmable gate array (FPGA). The one or more processors 120 may perform various functions by executing computer executable instructions stored in the memory (e.g., memory 130).

The one or more processors 120 may include one or more of a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The one or more processors 120 may control one or any combination of the other components of the electronic device, and may perform communication-related operations or data processing. The one or more processors 120 may execute one or more programs or instructions stored in the memory (e.g., memory 130). For example, the one or more processors 120 may perform a method according to an embodiment by executing one or more instructions stored in the memory (e.g., memory 130).

In a case where the method according to an embodiment of the disclosure includes a plurality of operations, the plurality of operations may be performed by one processor or by a plurality of processors. For example, in a case where a first operation, a second operation, and a third operation are performed by the method according to an embodiment, all of the first operation, the second operation, and the third operation may be performed by a first processor, or the first operation and the second operation may be performed by the first processor (e.g., a general-purpose processor) and the third operation may be performed by a second processor (e.g., an artificial intelligence-dedicated processor).

The one or more processors 120 may be implemented as a single-core processor including one core, or may be implemented as one or more multi-core processors including a plurality of cores (e.g., homogeneous multiple cores or heterogeneous multiple cores). In a case where the one or more processors 120 are implemented as multi-core processors, each of the plurality of cores included in the multi-core processors may include a processor internal memory such as a cache memory or an on-chip memory, and a common cache shared by the plurality of cores may be included in multi core processors. In addition, each of the plurality of cores (or some of the plurality of cores) included in the multi-core processors may independently read and execute program instructions for implementing the method according to an embodiment, or all (or some) of the plurality of cores may be linked to each other to read and execute program instructions for implementing the method according an embodiment.

In a case where the method according to an embodiment includes a plurality of operations, the plurality of operations may be performed by one of the plurality of cores included in the multi-core processors, or may be performed by the plurality of cores. For example, in a case where a first operation, a second operation, and a third operation are performed by the method according to an embodiment, all of the first operation, the second operation, and the third operation may be performed by a first core included in the multi-core processors, or the first operation and the second operation may be performed by the first core included in the multi-core processors, and the third operation may be performed by a second core included in the multi-core processors.

In embodiments of the disclosure, the processor may refer to a system on a chip (SoC) in which one or more processors and other electronic components are integrated, a single-core processor, multi-core processors, or a core included in the single-core processor or the multi-core processors. Here, the core may be implemented as a CPU, a GPU, an APU, an MIC, a DSP, an NPU, a hardware accelerator, a machine learning accelerator, or the like, but the embodiments of the disclosure are not limited thereto.

Figure 3:
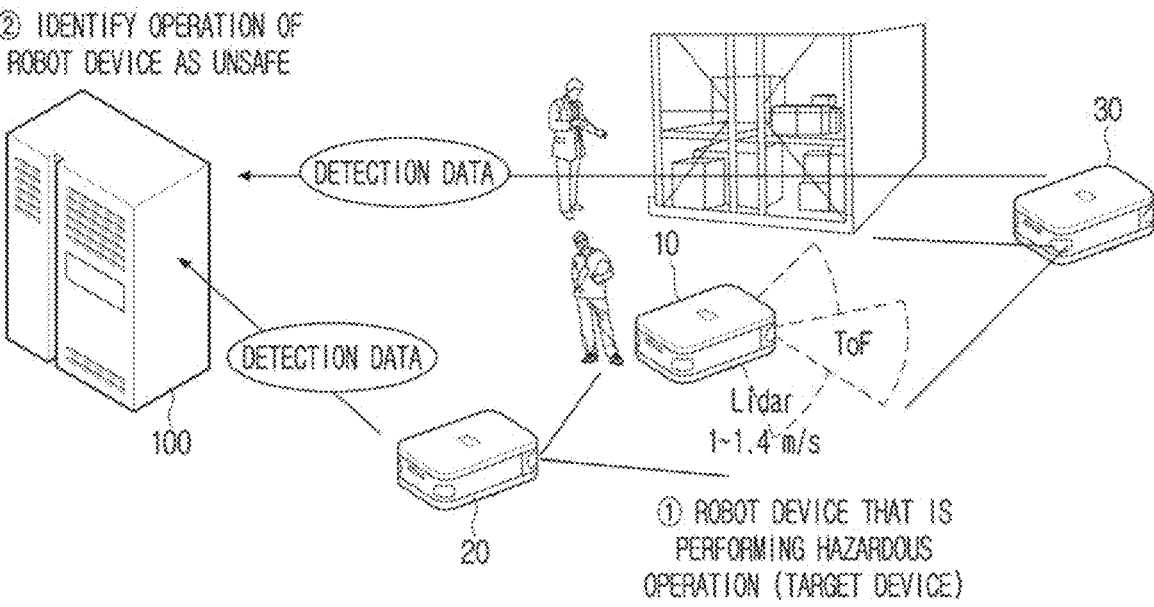
FIG. 3 is a diagram provided to explain robot devices that monitor a target device according to an embodiment.

FIG. 3 is a view provided to explain robot devices that monitor a target device according to an embodiment.

The one or more processors 120 may receive operation information of each of a plurality of robot devices 10, 20, 30 through a communication interface.

The one or more processors 120 may identify the first robot device 10 from among the plurality of robot devices 10, 20, 30 as the target device based on a plurality of pieces of operation information.

For example, the electronic device 100 may further include a memory (e.g., memory 130) that stores information regarding a hazardous operation.

When the operation of the first robot device 10 from among the plurality of robot devices corresponds to a hazardous operation based on the information regarding a hazardous operation, the one or more processors 120 may identify the first robot device 10 as the target device.

For example, when the name of the operation that is being performed by the first robot device 10 corresponds to one of a plurality of predefined names according to the information regarding a hazardous operation based on the operation information of the first robot device 10, the one or more processors 120 may identify the operation of the first robot device 10 as a hazardous operation and identify the first robot device 10 as the target device.

For example, when identifying whether each of a plurality of components included in the first robot device 10 operates, the level of load, etc. satisfy predefined conditions according to the information regarding a hazardous operation (e.g., i) when at least one component from among the plurality of components is being operated and ii) the level of load of the at least one component exceeds threshold load) based on the operation information of the first robot device 10, the one or more processors 120 may identify the first robot device 10 as the target device by identifying the operation of the first robot device 10 as a hazardous operation.

However, this is only an example, and the present disclosure is not limited thereto. For example, when the first robot device 10 is performing an operation (i.e., when the first robot device 10 is not in an idle state) based on the operation information of the first robot device 10, the one or more processors 120 may identify the first robot device 10 as the target device by identifying the operation of the first robot device 10 as a hazardous operation.

For example, the one or more processors 120 may input the operation information of the first robot device 10 to a neural network model, and the neural network model may output whether the operation of the first robot device 10 corresponds to a hazardous operation. The one or more processors 120 may identify the first robot device 10 as the target device based on the output of the neural network model.

The neural network model according to an embodiment may use the operation names (or task names) of various robot devices, whether each of the various components provided in the robot devices operate, the level of load, etc. as learning data, and it may be a model that is trained to, when the operation information of the robot device is input, output whether the operation according to the operation information corresponds to a hazardous operation.

The function related to artificial intelligence according to an embodiment is operated through the one or more processors 120 and the memory (e.g., memory 130) of the electronic device 100.

Here, the one or more processors may include at least one of a Central Processing Unit (CPU), a Graphic Processing Unit (GPU), or a Neural Processing Unit (NPU), but are not limited thereto.

The CPU is a generic-purpose processor which may perform not only general calculations but also artificial intelligence calculations, and may efficiently execute complex programs through a multi-layered cache structure. The CPU may be advantageous for a serial processing method that enables organic linkage between the previous calculation result and the next calculation result through sequential calculation. The generic-purpose processor is not limited to the above examples except for a case where the processor is specified as the above-mentioned CPU.

The GPU is a processor for large-scale operations such as floating-point operations used for graphics processing, and may perform the large-scale operations in parallel by integrating a large number of cores. In particular, the GPU may be advantageous for a parallel processing method such as a convolution operation or the like compared to the CPU. In addition, the GPU may be used as a co-processor to supplement a function of the CPU. The processor for the large-scale operations is not limited to the above example except for a case where the processor is specified as the above-mentioned GPU.

The NPU is a processor specialized in artificial intelligence calculation using an artificial neural network, and each layer included in the artificial neural network may be implemented in hardware (e.g., silicon). Here, the NPU is specially designed based on requirements of a company, and may thus have a lower degree of freedom than the CPU or the GPU. However, the NPU may efficiently process the artificial intelligence calculation required by the company. As the processor specialized for the artificial intelligence calculation, the NPU may be implemented in various forms such as a tensor processing unit (TPU), an intelligence processing unit (IPU), or a vision processing unit (VPU). The artificial intelligence processor 120 is not limited to the above example except for a case where the processor is specified as the above-mentioned NPU.

In addition, one or more processors may be implemented in a system on chip (SoC). Here, the SoC may further include a memory (e.g., memory 130) and a network interface such as a bus for data communication between the processor and the memory in addition to the one or more processors.

In case that the system on chip (SoC) included in the electronic device 100 includes a plurality of processors, the electronic device 100 may use some of the plurality of processors to perform the artificial intelligence calculation (e.g., calculation related to the learning or inference of an artificial intelligence model). For example, the electronic device 100 may perform the artificial intelligence calculation by using at least one of the GPU, NPU, VPU, TPU, or a hardware accelerator that is specialized for the artificial intelligence calculation such as convolution calculation and matrix multiplication calculation among the plurality of processors. However, this is only an example, and the artificial intelligence calculation may be processed using a generic-purpose processor such as the CPU.

In addition, the electronic device 100 may perform calculation for a function related to the artificial intelligence by using multi-cores (e.g., dual-core or quad-core) included in one processor 120. In particular, the electronic device 100 may perform the artificial intelligence calculation such as the convolution calculation and the matrix multiplication calculation in parallel using the multi-cores included in the processor 120.

The one or more processors 120 may process the input data based on a predefined operation rule or artificial intelligence model, stored in the memory (e.g., memory 130). The predefined operation rule or artificial intelligence model may be acquired by the learning.

Here, "acquired by the learning" may indicate that the predefined operation rule or artificial intelligence model of a desired feature is acquired by applying a learning algorithm to a large amount of learning data. Such learning may be performed on a device itself where the artificial intelligence is performed according to an embodiment, or by a separate server/system.

The artificial intelligence model may include a plurality of neural network layers. At least one layer has at least one weight value, and calculation of the layer may be performed through an operation result of a previous layer and at least one defined operation. Examples of the neural network may include a convolutional neural network (CNN), a deep neural network (DNN), a recurrent neural network (RNN), a restricted Boltzmann machine (RBM), a deep belief network (DBN), a bidirectional recurrent deep neural network (BRDNN), a deep Q-network, and a transformer. However, the neural network in this disclosure is not limited to the above examples except for a case where a type of the neural network is specified.

The learning algorithm is a method of training a predetermined target device (e.g., robot) by using a large number of learning data for the predetermined target device to make a decision or a prediction by itself. The learning algorithms may include, for example, a supervised learning algorithm, an unsupervised learning algorithm, a semi-supervised learning algorithm, or a reinforcement learning algorithm. However, the learning algorithm of the disclosure is not limited to the above-described examples, unless specified otherwise.

The one or more processors 120 according to an embodiment may control the remaining robot devices 20, 30 from among the plurality of robot devices 10, 20, 30 so that the remaining robot devices 20, 30 monitor the target device. Alternatively, the one or more processors 120 may control at least one of the robot devices (e.g., the second robot device 20 or the third robot device 30) between the remaining robot devices 20, 30 so that the at least one robot device monitors the target device.

According to an embodiment, each of the remaining robot devices 20, 30 may monitor the target device using a provided sensor under the control of the one or more processors 120.

According to an embodiment, when monitoring data is transmitted from the remaining robot devices 20, 30, the one or more processors 120 may identify whether the operation of the target device is safe based on the monitoring data.

According to an embodiment, the monitoring data may include at least one of photographic data of the target device, velocity data of the target device or location data of the target device obtained through a sensor included in each of the remaining robot devices 20, 30.

For example, the sensor included in each of the remaining robot devices 20, 30 may include a Lidar sensor, a camera (e.g., RGB-D), a pressure sensor, an infrared sensor, an ultrasonic sensor, etc.

When it is identified that the operation of the target device is unsafe based on the monitoring data received from the remaining robot devices 20, 30, the one or more processors 120 according to an embodiment may transmit a command for controlling the target device to the target device.

Referring to FIG. 3, when a predetermined object is located within a threshold distance from the target device based on the photographic data received from the remaining robot devices 20, 30, the one or more processors 120 may identify the operation of the target device unsafe.

The one or more processors 120 may identify whether the operation of the first robot device is a hazardous operation based on the operation information of the first robot device 10 from among the plurality of robot devices 10, 20, 30. For example, when the operation of the first robot device 10 is backward traveling at a predetermined speed, the one or more processors 120 may identify the operation of the first robot device 10 as a hazardous operation based on information regarding a hazardous operation.

The one or more processors 120 may identify the first robot device 10 as the target device, and control the remaining robots 20, 30 to monitor the target device.

When a sensor provided in the first robot device 10 monitors only the front of the first robot device 10 and fails to monitor the rear, there is a problem in that the first robot device 10 that is traveling backwards cannot monitor an object located at the rear corresponding to the traveling direction.

The robot devices 20, 30 according to an embodiment may monitor the surrounding environment of the first robot device 10 under the control of the one or more processors 120. For example, the sensor provided in each of the remaining robots 20, 30 may monitor an object located at the rear of the first robot device 10.

For example, the one or more processors 120 may identify whether the operation of the target device is safe based on photographic data received from the remaining robot devices 20, 30. For example, when a predetermined object (e.g., people, flammable materials, fragile materials, obstacles (e.g., stationary robots, shelves, etc.), etc.) is located within a threshold distance from the target device, the one or more processors 120 may identify the operation of the target device as unsafe.

When the operation of the target device is identified as unsafe, the one or more processors 120 according to an embodiment may transmit a command for controlling the target device to the target device.

The one or more processors 120 may identify whether the operation of the first robot device is a hazardous operation based on the operation information of the first robot device 10 from among the plurality of robot devices 10, 20, 30. For example, when the operation of the first robot device 10 is forward traveling at a predetermined speed, the one or more processors 120 may identify that the operation of the first robot device 10 is a hazardous operation based on information regarding a hazardous operation.

The one or more processors 120 may identify the first robot device 10 as the target device, and control the remaining robot devices 20, 30 to monitor the target device. According to an embodiment, the one or more processors 120 may control one (e.g., the second robot device 20 or the third robot device 30) of the remaining robot devices 20, 30 to monitor the target device.

When a sensor provided in the first robot device 10 according to an embodiment fails to monitor the traveling speed of the first robot device 10, or when an error occurs in the actuator provided in the first robot device 10 for various reasons, there is a risk that the first robot device 10 will travel forward exceeding the predetermined speed.

The remaining robot devices 20, 30 according to an embodiment may monitor the surrounding environment of the first robot device 10 under the control of the one or more processor 120. For example, the sensor provided in each of the remaining robot devices 20, 30 may monitor the traveling speed of the first robot device 10.

For example, the one or more processors 120 may receive velocity data from the remaining robot devices 20, 30, and identify the traveling speed of the target device.

The one or more processors 120 may identify whether the operation of the target device is safe based on the velocity data received from the remaining robot devices 20, 30. For example, when the traveling speed of the target device exceeds a threshold speed (or a predetermined speed), the one or more processors 120 may identify the operation of the target device as unsafe.

When the operation of the target device is identified as unsafe, the one or more processors 120 according to an embodiment may transmit a command for controlling the target device to the target device.

However, the present disclosure is not limited to the above, and the one or more processors 120 may identify whether the operation of the target device is unsafe in various ways using the monitoring data received from the remaining robot devices 20, 30.

Figure 4:
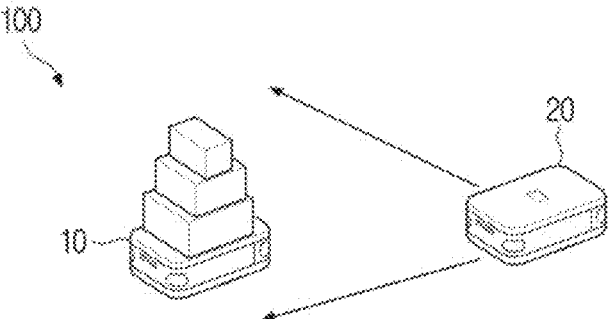
FIG. 4 is a diagram provided to explain an electronic device that identifies a loading state of objects loaded on a target device according to an embodiment.
Figure 4:
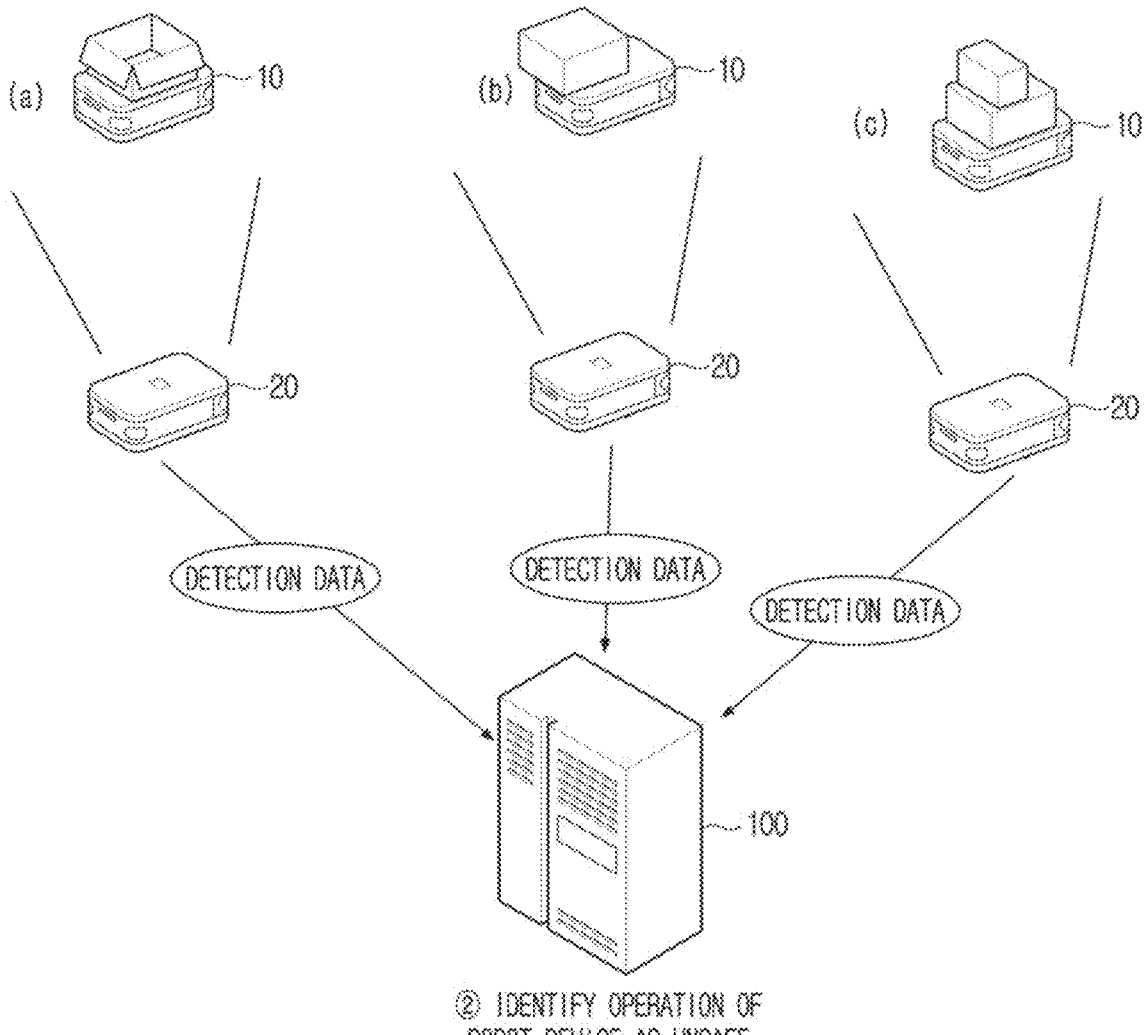

FIG. 4 is a view provided to explain a robot device that identifies a loading state of objects loaded on a target device according to an embodiment.

Referring to FIG. 4, when the operation of the first robot device 10 from among the plurality of robot devices 10, 20, 30 is a transport operation of an object loaded on the first robot device 10, the one or more processors 120 may identify the first robot device 10 as the target device.

For example, when the operation name of the first robot device 10 is an object transporting operation or when a pressure exceeding a threshold value (e.g., a pressure due to the weight of the main body of the first robot device 10) is detected in the actuator of the first robot device 10 due to the object loaded on the first robot device 10 based on the operation information received from the first robot device 10, the one or more processors 120 may identify that the object is loaded on the first robot device 10, and identify the operation of the first robot device 10 as a hazardous operation.

The one or more processors 120 according to an embodiment may control the remaining robot devices 20, 30 from among the plurality of robot devices 10, 20, 30 so that the remaining robot devices 20, 30 monitor the target device.

The sensor provided in the first robot device 10 according to an embodiment may not monitor the loading state of the object loaded on the first robot device 10. When the first robot device 10 performs the object transporting operation in an unsafe loading state, there is a risk that an accident such as collapsing of objects may occur.

The remaining robot devices 20, 30 according to an embodiment may monitor the surrounding environment of the first robot device 10 under the control of the one or more processors 120. For example, the sensor provided in each of the remaining robot devices 20, 30 may obtain photographic data by photographing objects loaded on the first robot device 10.

For example, the one or more processors 120 may receive photographic data from the remaining robot devices 20, 30, and identify whether the loading state of objects loaded on the target device is defective.

When it is identified that the loading state of the objects loaded on the target device is defective or improper, the one or more processors 120 according to an embodiment may identify the operation of the target device as unsafe.

When it is identified that the operation of the target device is unsafe, the one or more processors 120 according to an embodiment may transmit a command for controlling the target device to the target device.

For example, when it is identified that the operation of the target device is unsafe, the one or more processors 120 may stop the operation of the target device, or transmit a command for the target device to adjust the speed of performing the operation, a command for the target device to output a warning sound (e.g., a beep sound) to the target device.

Figure 5:
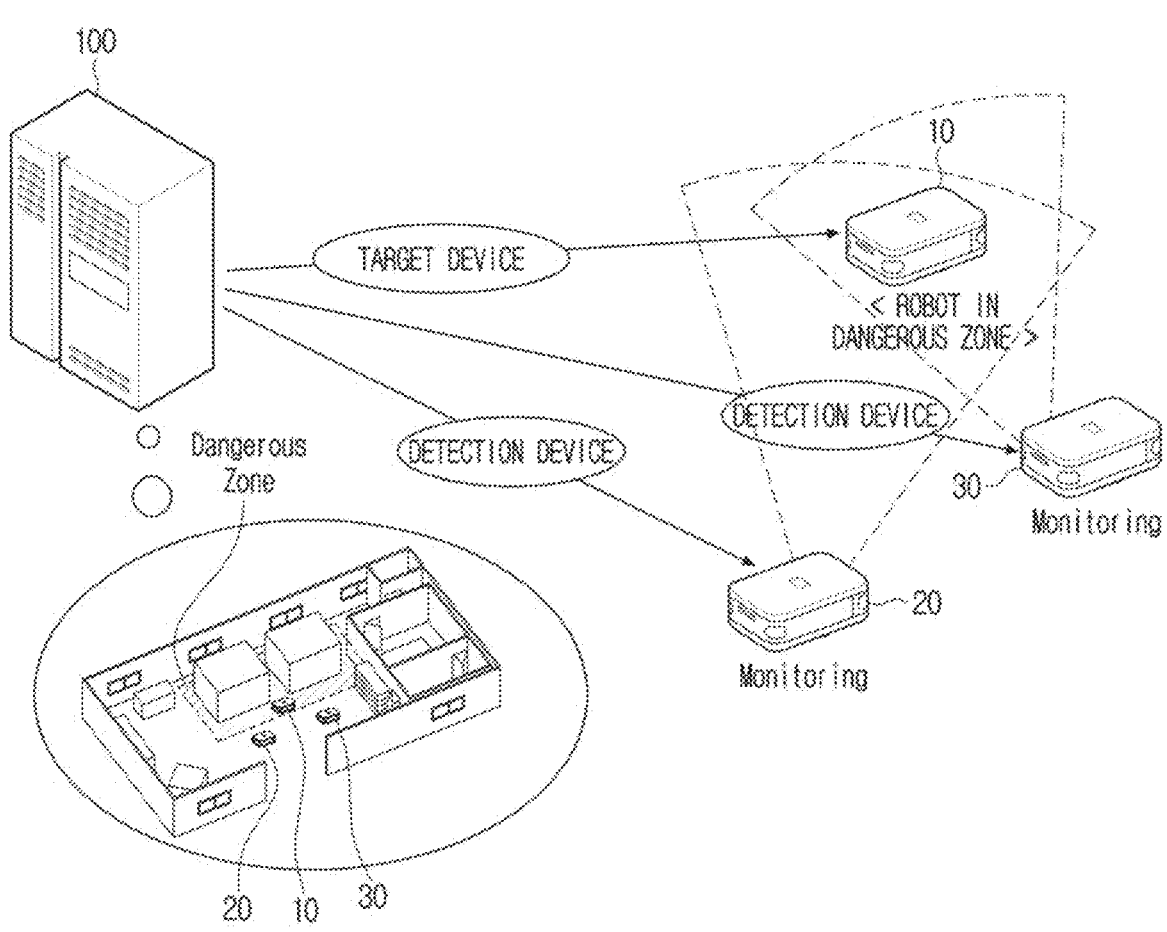
FIG. 5 is a diagram provided to explain an electronic device that identifies a target device using location information according to an embodiment.

FIG. 5 is a view provided to explain an electronic device that identifies a target device using location information according to an embodiment.

The electronic device 100 according to an embodiment may further include a memory 130 storing map information corresponding to a space where the plurality of robot devices 10, 20, 30 are located.

Here, the map information may divide a space into a plurality of regions (e.g., movable regions, non-movable regions, etc.) by identifying the point where there are dividing lines or ledges, the point where the movable width narrows, the point where there is a wall, the point where the wall starts, the point where the wall ends, the point where there is a door, the point where there are obstacles (e.g., stationary robots, shelves, rails, etc.) in the space (e.g., factory, warehouse, etc.) where the plurality of robot devices 10, 20, 30 are located, and include information regarding the size and shape of each of the plurality of regions, the size, shape and location of each of the obstacles located in each of the plurality of regions.

In particular, the map information may include information regarding a hazardous region in the space (hereinafter, referred to as hazardous region information).

The hazardous region information according to an embodiment may be set by a user input. However, the hazardous region information is not limited to the above, and the one or more processors 120 may identify a region satisfying a predetermined condition based on the map information as hazardous region information. For example, the one or more processors 120 may identify the point where the movable width narrows within the movable region based on the map information, the point where an obstacle is located adjacently within the movable region (e.g., within the threshold distance), or the point of sharp curve or sharp turn within the movable region, or the point adjacent to predetermined objects (e.g., flammable materials, fragile materials, obstacles (e.g., stationary robots, shelves, rails, etc.), etc.) as hazardous region information.

The memory (e.g., memory 130) according to an embodiment may store information necessary for various embodiments. The memory may be implemented in a memory form embedded in the electronic device 100 or in a memory form detachable from the electronic device 100 according to the data storage purpose.

For example, data for driving the electronic device 100 may be stored in the memory 130 embedded in the electronic device 100, and data for the expansion function of the electronic device 100 may be stored in the memory detachable from the electronic device 100. The memory 130 embedded in the electronic device 100 may be implemented as at least one of a volatile memory (e.g. a dynamic RAM (DRAM), a static RAM (SRAM), or a synchronous dynamic RAM (SDRAM)) and a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g. a NAND flash or a NOR flash), a hard drive, or a solid state drive (SSD)). In addition, the memory detachable from the electronic device 100 may be implemented in the form of a memory card (e.g., a compact flash (CF), a secure digital (SD), a micro secure digital (Micro-SD), a mini secure digital (Mini-SD), an extreme digital (xD), or a multi-media card (MMC)), an external memory connectable to a USB port (e.g., a USB memory), or the like.

The memory 130 according to an embodiment may store a computer program including at least one instruction or instructions for controlling the electronic device 100.

The one or more processors 120 according to an embodiment may receive location information from each of the plurality of robot devices 10, 20, 30 through the communication interface 110.

For example, each of the plurality of robot devices 10, 20, 30 may be equipped with a GPS sensor and obtain corresponding location information. However, the present disclosure is not limited thereto, and each of the plurality of robot devices 10, 20, 30 may obtain corresponding location information using dividing lines (partitioning lines) illustrated in the on the floor of the apace, or may obtain corresponding location information using photographic data obtained through a camera.

When the corresponding location information is received from each of the plurality of robot devices 10, 20, 30, the one or more processors 120 may identify at least one robot device located in a hazardous region according to the hazardous region information from among the plurality of robot devices 10, 20, 30 based on a plurality of pieces of location information.

For example, when it is identified that the first robot device 10 from among the plurality of robot devices 10, 20, 30 is located in a hazardous region, the one or more processors 120 may identify the first robot device 10 as the target device.

Subsequently, the one or more processors 120 may control the remaining robot devices 20, 30 to monitor the target device. The remaining robot devices 20, 30 according to an embodiment may monitor the target device and the surrounding environment of the target device under the control of the one or more processors 120.

The one or more processors 120 may control the communication interface 110 to transmit a command for controlling the target device (e.g., a command for stopping or pausing the operation, adjusting the performance speed of the operation, or changing the performance method of the operation) to the target device based on the surrounding environment of the target device monitored by the remaining robot devices 20, 30. For example, when the operation of the target device is identified as unsafe based on monitoring data received from the remaining robot devices 20, 30, the one or more processors 120 may control the communication interface 110 to transmit a command for controlling the target device to the target device.

Figure 6:
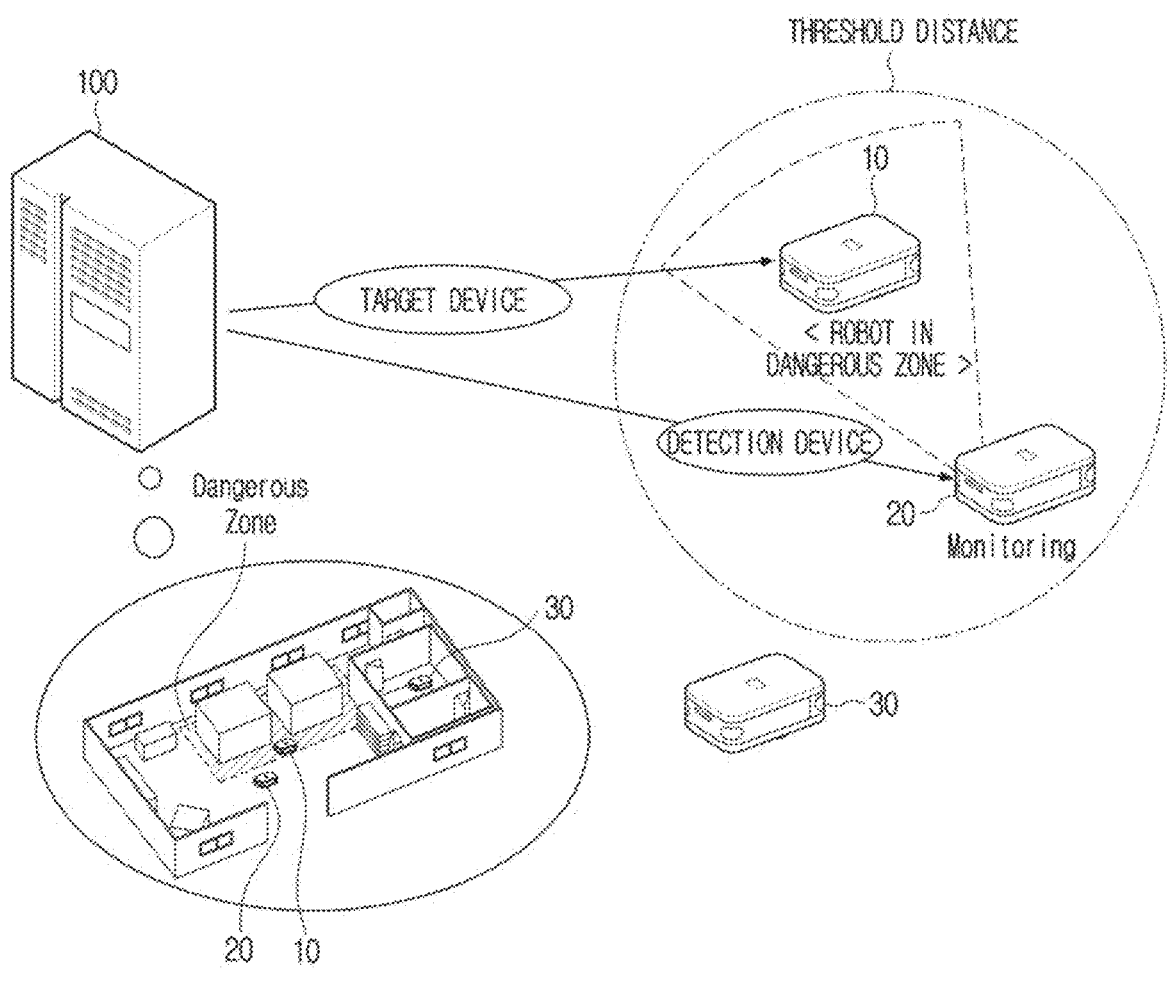
FIG. 6 is a diagram provided to explain an electronic device that identifies a second robot located within a threshold distance from a target device according to an embodiment.

FIG. 6 is a view provided to explain an electronic device that identifies a second robot located within a threshold distance from a target device according to an embodiment.

When the first robot device 10 from among the plurality of robot devices 10, 20, 30 is identified as the target device, the one or more processors 120 according to an embodiment may identify a second robot device 20 located within a threshold distance from the current location of the target device based on location information received from each of the plurality of robot devices 10, 20, 30.

The one or more processors 120 according to an embodiment may control the second robot device 20 to monitor the target device.

For example, when the operation of the first robot device 10 from among the plurality of robot devices corresponds to a hazardous operation based on a plurality of pieces of operation information, the one or more processors 120 may identify the first robot device 10 as the target device. The one or more processors 120 according to an embodiment may identify the second robot device 20 located within the threshold distance of the target device.

For example, when the operation of the first robot device 10 from among the plurality of robot devices corresponds to a hazardous operation based on the plurality of pieces of operation information, the one or more processors 120 may identify the first robot device 10 as the target device. The one or more processors 120 according to an embodiment may identify the second robot device 20 located within the threshold distance from the target device.

For example, the one or more processors 120 may identify the first robot device 10 located in a hazardous region according to the hazardous region information from among the plurality of robot devices 10, 20, 30 based on the plurality of pieces of location information as the target device. The one or more processors 120 according to an embodiment may identify the second robot device 20 located within the threshold distance from the target device, and control the second robot device 20 to monitor the target device and the surrounding environment of the target device.

The one or more processors 120 according to an embodiment may identify whether the operation of the target device is safe based on monitoring data received from the second robot device 20.

Figure 7:
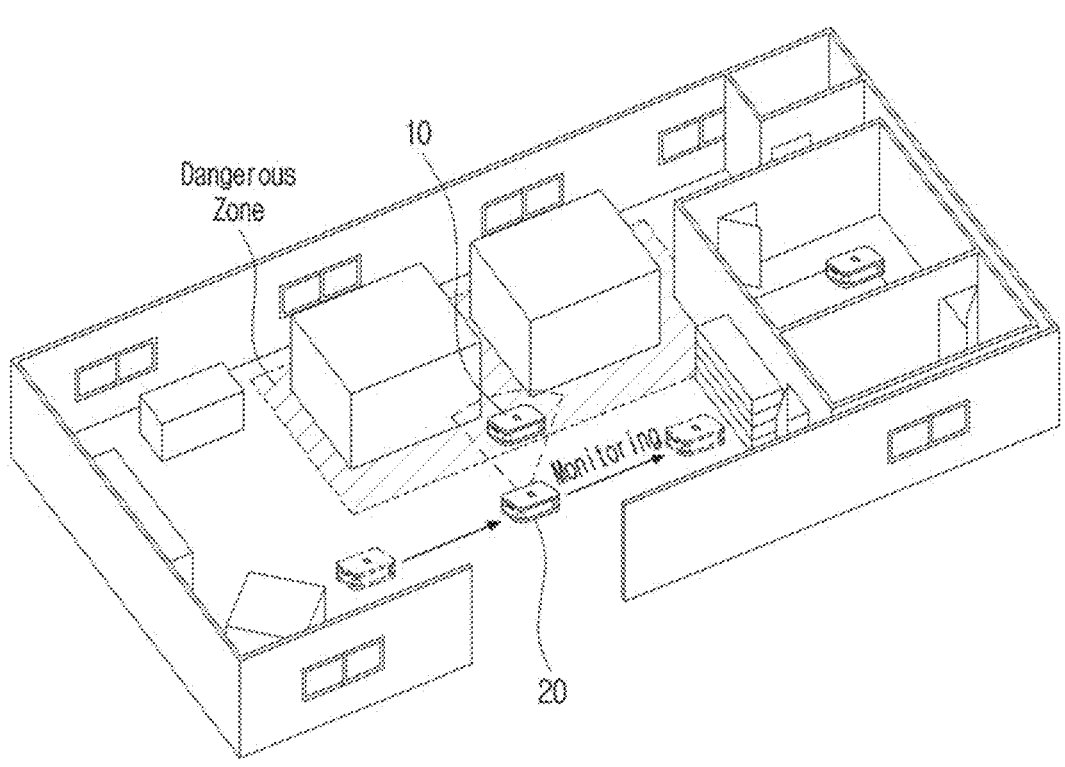
FIG. 7 is a diagram provided to explain an electronic device that controls a second robot device to monitor a target device according to an embodiment.

FIG. 7 is a view provided to explain an electronic device that controls a second robot device to monitor a target device according to an embodiment.

Each of the plurality of robot devices 10, 20, 30 according to an embodiment may be performing an operation.

For example, the first robot device 10 may be performing an operation of transporting a loaded object, and the second robot device 20 may be performing an operation of moving from a first location to a second location according to a travel path.

When it is identified that the first robot device 10 is the target device, the one or more processors 120 may i) control the remaining robot devices 20, 30, excluding the first robot device 10, from among the plurality of robot devices 10, 20, 30, to monitor the first robot device 10, or ii) control the second robot device 20 located within the threshold distance from the first robot device 10 between the remaining robots 20, 30 to monitor the first robot device.

For example, the one or more processors 120 may receive location information of the second robot device 20 that is performing the operation of moving from the first location to the second location from the second robot device 20, and control the second robot device 20 to monitor the first robot device while the second robot device 20 is located within the threshold distance from the first robot device 10 based on the received location information of the second robot device 20.

Accordingly, while performing the operation of the second robot device 20 (i.e., the operation of moving from the first location to the second location according to the travel path), the second robot device 20 may monitor the first robot device 10 only while the second robot device 20 is adjacent to the first robot device 10.

For example, while, performing the operation of the third robot device 30 (e.g., an operation of assembling modules at a fixed location), the third robot device 30 may monitor the first robot device 10 only while the third robot device 30 is adjacent to the first robot device 10.

Accordingly, while the first robot device 10 is performing an operation (e.g., an operation of transporting a loaded object), the second robot device 20 may monitor the first robot device 10 and transmit the monitoring data to the electronic device 100 during a first time section, and the third robot device 30 may monitor the first robot device 10 and transmit the monitoring data to the electronic device 100 during a second time section.

The one or more processors 120 may identify whether the operation of the first robot device 10 is safe based on the monitoring data received from the second robot device 20 during the first time section, and identify whether the operation of the first robot device 10 is safe based on the monitoring data received from the third robot device 30 during the second time section.

Here, the sum of the first time section and the second time section may or may not correspond to the total time required for the first robot device 10 to perform an operation.

Figure 8:
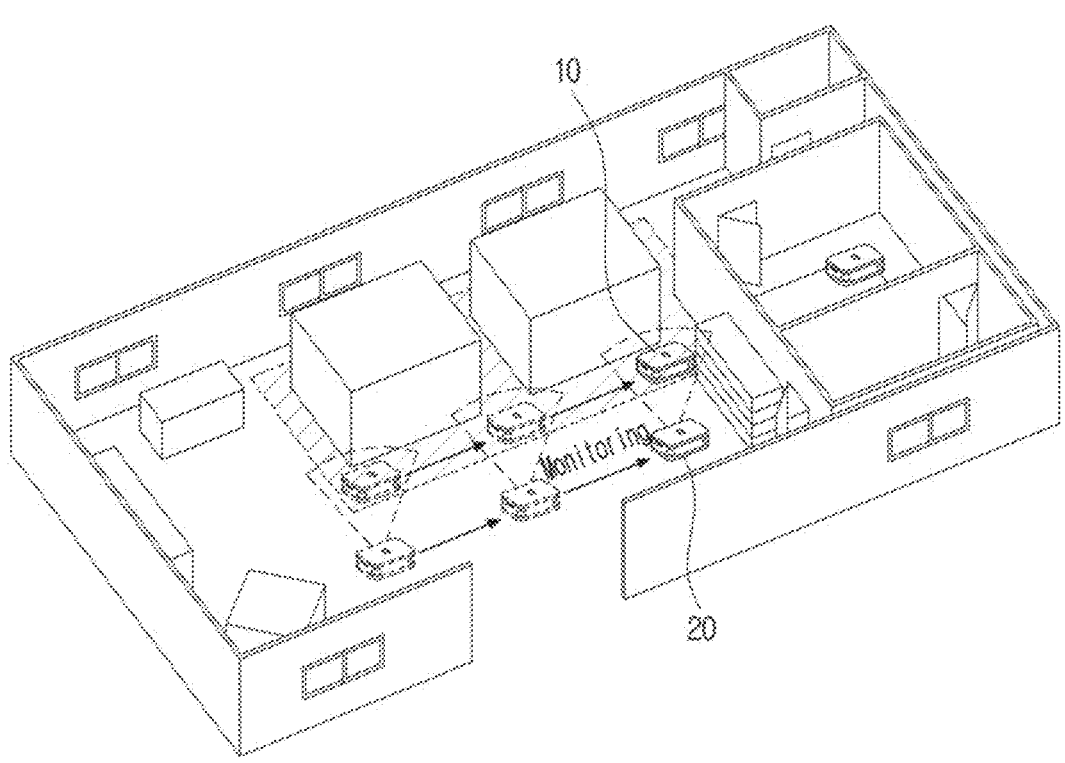
FIG. 8 is a diagram provided to explain an electronic device that controls a second robot device to monitor a target device according to an embodiment.

FIG. 8 is a view provided to explain an electronic device that controls a second robot device to monitor a target device according to an embodiment.

The one or more processors 120 according to an embodiment may identify the first robot device 10 from among the plurality of robot devices 10, 20, 30 as the target device based on the plurality of pieces of operation information.

Subsequently, the one or more processors 120 may identify at least one robot device (e.g., the second robot device 20) for monitoring the target device based on operation information corresponding to each of the remaining robot devices 20, 30.

For example, the one or more processors 120 may identify the second robot device 20 that is in an idle state based on operation information corresponding to each of the remaining robot devices 20, 30.

The one or more processors 120 may control the second robot device 20 so that the second robot device 20 follows the target device and monitors the target device while following the target device.

For example, as illustrated in FIG. 8, the second robot device 20 that is in an idle state may monitor the first robot device 10 while maintaining the threshold distance from the first robot device 10 under the control of the electronic device 100 while the first robot device 10 is performing an operation (e.g., an operation of transporting a loaded object).

Accordingly, while the first robot device 10 is performing the operation (e.g., the operation of transporting a loaded object), the second robot device 20 may monitor the first robot device 10 and transmit the monitoring data to the electronic device 100 during the first time section.

The one or more processors 120 may identify whether the operation of the first robot device 10 is safe based on the monitoring data received from the second robot device 20 during the first time section. Here, the first time section may or may not correspond to the total time required for the first robot device 10 to perform an operation.

The one or more processors 120 according to an embodiment may identify priorities between operations being performed by each of the plurality of robot devices 10, 20, 30 based on operation information received from each of the plurality of robot devices 10, 20, 30.

For example, the one or more processors 120 may identify priorities between operations being performed by each of the plurality of robot devices 10, 20, 30 based on operation scheduling. The operation scheduling may be set according to a user input, or may be set based on various conventional criteria for setting priorities between a plurality of operations (e.g., time required for an operation, order of precedence between a plurality of operations according to sequence information).

When the operation of the first robot device 10 from among the plurality of robot devices corresponds to a hazardous operation based on information regarding a hazardous operation, the one or more processors 120 may identify the first robot device 10 as the target device.

Subsequently, the one or more processors 120 may identify the second robot device 20 that performs an operation having a relatively lower priority than the operation being performed by the first robot device 10 from among operations performed by each of the remaining robot devices 20, 30. In addition, the one or more processors 120 may identify the third robot device 30 that performs an operation having a relatively higher priority than the operation being performed by the first robot device 10.

The one or more processors 120 may switch the second robot device 20 to an idle state by stopping (or pausing) the operation being performed by the second robot device 20 (e.g., an operation having a relatively lower priority than the operation being performed by the first robot device 10). Subsequently, the one or more processors 120 may control the second robot device 20 so that the second robot device 20 follows the target device and monitor the target device while following the target device.

For example, as illustrated in FIG. 8, the second robot device 20 that is in an idle state may monitor the first robot device 10 while maintaining the threshold distance from the first robot device 10 under the control of the electronic device 100 while the first robot device 10 performs an operation (e.g., an operation of transporting a loaded object).

According to an embodiment, when the first robot device 10 completes the operation (e.g., the operation of transporting a loaded object), the one or more processors 120 may control the second robot device 20 so that the second robot device 20 continues to perform the stopped (or paused) operation.

According to an embodiment, when the operation of the target device is identified as unsafe based on the monitoring data received from the second robot device 20, the one or more processors 120 may transmit a command for controlling the target device to the target device.

For example, when the operation of the target device is identified as unsafe, the one or more processors 120 may stop the operation of the target device, or may transmit a command for adjusting the speed at which the target device performs an operation, a command for controlling the target device to output a warning sound (e.g., a beep sound), etc. to the target device.

In addition, after the command for controlling the target device to the target device, when the operation of the target device is re-identified as unsafe based on the monitoring data re-received from the second robot device 20 that monitors the target device, the one or more processors 120 may transmit a command for forcibly controlling the target device to the second robot device 20. Here, the command for forcibly controlling the target device may include a command for reducing the performance speed (e.g., travelling speed) of the operation of the target device with physical external force by controlling the second robot device 20 that monitors the target device to directly collide (or forcibly dock) with the target device.

Figure 9:
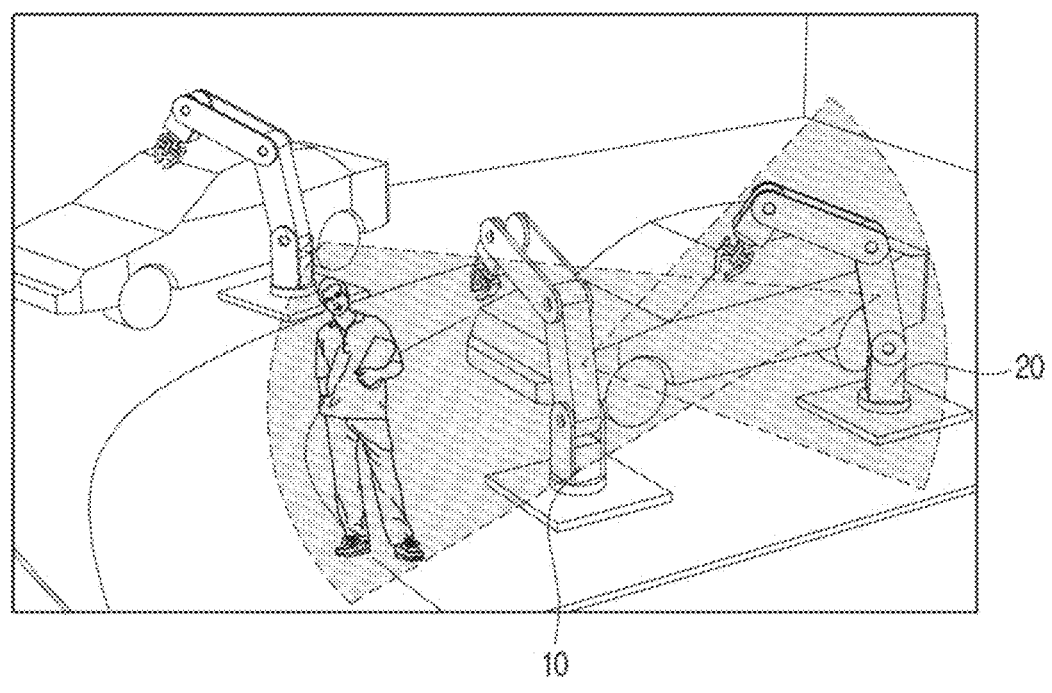
FIG. 9 is a diagram provided to explain a method in which a first robot and a second robot located adjacent to each other monitor each other to obtain monitoring data corresponding to the first robot device and monitoring data corresponding to the second robot device.

FIG. 9 is a view provided to explain a method in which a first robot and a second robot located adjacent to each other monitor each other to obtain monitoring data corresponding to the first robot device and monitoring data corresponding to the second robot device.

According to an embodiment, the one or more processors 120 may control so that i) one (e.g., the first robot device 10) of the plurality of robot devices 10, 20, 30 is identified as the target device and the remaining robot devices 20, 30 monitor the target device, or ii) the plurality of robot devices 10, 20, 30 monitor one another.

For example, the one or more processors 120 may identify the first robot device 10 and the second robot device 20 that are located adjacent to each other within the threshold distance based on location information regarding each of the plurality of robot devices 10, 20, 20 received through the communication interface 110.

The one or more processors 120 may control the first robot device 10 so that the first robot device 10 monitors the second robot device 20. In other words, the one or more processors 120 may identify the second robot device 20 as the target device, and control the first robot device 10 to monitor the second robot device 20.

In addition, the one or more processors 120 may control the second robot device 20 so that the second robot device 20 monitors the first robot device. In other words, the one or more processors 120 may identify the first robot device 10 as the target device, and control the second robot device 20 to monitor the first robot device 10.

For example, the one or more processors 120 may control the first robot device 10 and the second robot device 20 to monitor each other regardless of whether the operation performed by each of the first robot device 10 and the second robot device 20 corresponds to a hazardous operation.

Here, the first robot device 10 may be the target device and at the same time, a monitoring device that monitors the second robot device 20. Likewise, the second robot device 20 may be the target device and at the same time, a monitoring device that monitors the first robot device 10.

When first monitoring data is received from the first robot device 10 that monitors the second robot device 20, the one or more processors 120 may identify whether the operation of the second robot device 20 is safe based on the first monitoring data and transmit a command for controlling the second robot device 20. In addition, when second monitoring data is received from the second robot device 20 that monitors the first robot device 10, the one or more processors 120 may identify whether the operation of the first robot device 10 is safe based on the second monitoring data and transmit a command for controlling the first robot device 10.

Referring to FIG. 9, each of the plurality of robot devices 10, 20, 30 may also be implemented as a stationary robot.

The one or more processors 120 may identify the first robot device 10 and the second robot device 20 that are located adjacent to each other within the threshold distance from among the plurality of robot devices 10, 20, 30.

The one or more processors 120 may control the first robot device 10 to monitor the second robot device 20 and the surrounding environment of the second robot device 20. Alternatively, the one or more processors 120 may control the second robot device 20 to monitor the first robot device 10 and the surrounding environment of the first robot device 10.

The one or more processors 120 according to an embodiment may identify an object located in some regions (e.g., blind spots) that are not monitored (or cannot be monitored) by a sensor provided in the second robot device 20 based on the first monitoring data received from the first robot device 10 that monitors the second robot device 20, and identify whether the operation of the second robot device 20 is safe.

In addition, the one or more processors 120 may identify an object located in some regions that are not monitored (or cannot be monitored) by a sensor provided in the first robot device 10 based on the second monitoring data received from the second robot device 20 that monitors the first robot device 10, and identify whether the operation of the first robot device 10 is safe.

FIG. 10 is a flowchart provided to explain a controlling method of an electronic device according to an embodiment.

The controlling method of an electronic device according to an embodiment comprises first receiving operation information of each of a plurality of robot devices (S1010).

At least one first robot device is identified as the target device based on a plurality of pieces of operation information (S1020).

At least one of the remaining robot devices is controlled to monitor the target device (S1030).

When monitoring data is received from the at least one robot device that monitors the target device, it is identified whether the operation of the target device according to operation information is safe based on the monitoring data (S1040).

Based on a result of the identification, a command for controlling the target device is transmitted to the target device (S1050).

The operation S1020 in which at least one first robot device is identified as the target device according to an embodiment may include, when the operation of the at least one first robot device from among the plurality of robot devices corresponds to a hazardous operation based on information regarding a hazardous operation, identifying the at least one first robot device as the target device.

The electronic device according to an embodiment may include map information corresponding to the space in which a plurality of robot devices are located, and the map information may include information regarding a hazardous region within the space. The controlling method according to an embodiment may further include receiving location information of each of the plurality of robot devices, and the operation S1020 that identifies at least one first robot device as the target device may include identifying at least one first robot device located in a hazardous region according to the hazardous region information from among the plurality of robot devices as the target device based on a plurality of pieces of location information. The command for controlling the target device may be a command for stopping the operation of the target device, or a command for controlling the target device to output a warning sound.

The operation S1030 that controls the remaining robot devices according to an embodiment may include identifying at least one second robot device located within the threshold distance from the current location of the target device from among the remaining robot devices based on the plurality of pieces of location information and controlling the at least one second robot device to monitor the target device.

The monitoring data according to an embodiment may include at least one of photographic data of the target device obtaining through a sensor included in at least one robot device, velocity data of the target device, or location data of the target device.

The operation S1040 that identifies whether the operation of the target device is safe according to an embodiment may include, when identifying that a predetermined object is located within the threshold distance from the target device or the loading state of objects loaded on the target device is defective, identifying the operation of the target device as unsafe. The transmitting operation S1050 may include, when identifying that the operation of the target device as unsafe, transmitting a command for controlling the target device to the target device.

The operation S1040 that identifies whether the operation of the target device is safe according to an embodiment may include, when the traveling speed of the target device is equal to or greater than the threshold speed based on the velocity data or the target device is located in a hazardous region based on the location data, identifying the operation of the target device as unsafe, and the transmitting operation S1050 may include, when identifying the operation of the target device as unsafe, transmitting a command for controlling the target device to the target device.

Each of the plurality of pieces of operation information according to an embodiment may include the operation of the corresponding robot device, whether the operation is performed, and the traveling path, and the step S1030 that controls the remaining robot devices may include identifying at least one second robot device that is in an idle state based on operation information corresponding to each of the remaining robot devices and transmitting a command for controlling the at least one second robot device to follow the at least one first robot device to the at least one second robot device. The step S1040 that identifies whether the operation of the target device is safe may include identifying whether the operation of the target device is safe based on monitoring data received from the at least one second robot device.

The controlling method according to an embodiment may include receiving location information of each of a plurality of robot devices, identifying at least one robot device and at least one second robot device located adjacent to each other within the threshold distance based on the location information of each of the plurality of robot devices, controlling the at least one first robot device to monitor the at least one second robot device, when first monitoring data is received from the at least one first robot device that monitors the at least one second robot device, identifying whether the operation of the at least one second robot device is safe based on the first monitoring data and transmitting a command for controlling the at least one second device, controlling the at least one second robot to monitor the at least one first robot device, and when second monitoring data is received from the at least one second robot device that monitors the at least one first robot device, identifying whether the operation of the at least one first robot device is safe based on the second monitoring data and transmitting a command for controlling the at least one first robot device.

The command for controlling the target device according to an embodiment may be a command for stopping the operation of the target device or controlling the target device to output a warning sound.

However, various embodiments of the present disclosure may be applied not only to an electronic device but also any types of electronic devices capable of communicating with an external device.

The various embodiments described above may be implemented in a computer or a recording medium readable by a computer or a similar device using software, hardware, or a combination of software and hardware. In some cases, the embodiments described in the specification may be implemented by a processor itself. According to software implementation, the embodiments such as the procedures and functions described in the specification may be implemented by separate software modules. Each of the software modules may perform one or more functions and operations described in the specification.

Computer instructions for performing processing operations of a robot device according to the various embodiment of the disclosure described above may be stored in a non-transitory computer-readable medium. The computer instructions stored in the non-transitory computer-readable medium may allow a specific device to perform the processing operations of the electronic device 100 according to the various embodiments described above in case that the computer instructions are executed by a processor of the specific device.

The non-transitory computer-readable medium is not a medium that stores data therein for a while, such as a register, a cache, or a memory, and indicates a medium that semi-permanently stores data therein and is readable by a device. A specific example of the non-transitory computer-readable medium may include a compact disk (CD), a digital versatile disk (DVD), a hard disk, a Blu-ray disk, a universal serial bus (USB), a memory card, a read-only memory (ROM), or the like.

Also, while embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:
1. An electronic device comprising:
a communication interface;
at least one memory storing one or more instructions; and
one or more processors in communication with the at least one memory to execute the one or more instructions;

wherein the one or more instructions, when executed by the one or more processors individually or collectively, cause the electronic device to:

receive, through the communication interface, operation information of a plurality of robot devices;

identify at least one first robot device from among the plurality of robot devices as a target device based on the operation information;

control, through the communication interface, at least one second robot device from among the plurality of robot devices to monitor the target device;

based on receiving monitoring data from the at least one second robot device through the communication interface:

identify whether an operation of the target device is safe based on the monitoring data, and transmit, through the communication interface, a command to the target device based on a result of the identification of the operation of the target device;

control, through the communication interface, the target device to monitor the at least one second robot device; and based on receiving first monitoring data from the target device through the communication interface:

identify whether an operation of the at least one second robot device is safe based on the first monitoring data, and transmit, through the communication interface, a command to the at least one second robot device.

2. The electronic device of claim 1, wherein the at least one memory stores information related to a hazardous operation, and wherein the one or more instructions, when executed by the one or more processors individually or collectively, further cause the electronic device to:

based on the operation of the at least one first robot device comprising the hazardous operation based on the information related to the hazardous operation, identify the at least one first robot device as the target device.

3. The electronic device of claim 1, wherein the at least one memory stores map information corresponding to a space in which the plurality of robot devices are located, wherein the map information comprises hazardous region information, and wherein the one or more instructions, when executed by the one or more processors individually or collectively, further cause the electronic device to:

receive, through the communication interface, location information regarding the plurality of robot devices; and based on identifying a location of the at least one first robot device as being in a hazardous region based on the hazardous region information and the location information, identify the at least one first robot device, from among the plurality of robot devices, as the target device.

4. The electronic device of claim 3, wherein the one or more instructions, when executed by the one or more processors individually or collectively, further cause the electronic device to:

identify the at least one second robot device based on identifying that the at least one second robot device is located within a threshold distance of the target device based on the location information.

5. The electronic device of claim 1, wherein the monitoring data comprises at least one of photographic data of the target device, velocity data of the target device, or location data of the target device.

6. The electronic device of claim 5, wherein the one or more instructions, when executed by the one or more processors individually or collectively, further cause the electronic device to:

based on identifying that a predetermined object is located within a threshold distance of the target device based on the photographic data or identifying that a loading state of an object loaded on the target device is defective based on the photographic data, identify the operation of the target device as unsafe; and transmit, through the communication interface, the command to the target device based on identifying that the operation of the target device is unsafe.

7. The electronic device of claim 5, wherein the one or more instructions, when executed by the one or more processors individually or collectively, further cause the electronic device to:

based on a traveling speed of the target device being equal to or greater than a threshold speed based on the velocity data or the target device being located in a hazardous region based on the location data, identify the operation of the target device as unsafe; and transmit, through the communication interface, the command to the target device based on identifying that the operation of the target device is unsafe.

8. The electronic device of claim 1, wherein the operation information comprises, for a respective robot device of the plurality of robot devices, information regarding an operation of the respective robot device, information identifying whether the operation of the respective robot device is performed, and a traveling path of the respective robot device, and wherein the one or more instructions, when executed by the one or more processors, further cause the electronic device to:

identify the at least one second robot device based on identifying that the at least one second robot device is in an idle state based on the operation information;

transmit, through the communication interface, a command to the at least one second robot device which causes the at least one second robot device to follow the target device; and identify whether the operation of the target device is safe based on the monitoring data.

9. The electronic device of claim 1, wherein the one or more instructions, when executed by the one or more processors, further cause the electronic device to:

receive, through the communication interface, location information regarding the plurality of robot devices; and identify, based on the location information, the at least one second robot device based on identifying that the at least one second robot device is adjacent to and within a threshold distance of the target device.

10. The electronic device of claim 1, wherein the command comprises an instruction causing the target device to output a warning sound.

11. A method of controlling an electronic device, the method comprising:

receiving operation information of a plurality of robot devices;

identifying at least one first robot device from among the plurality of robot devices as a target device based on the operation information;

controlling at least one second robot device from among the plurality of robot devices to monitor the target device;

based on receiving monitoring data from the at least one second robot device:

identifying whether an operation of the target device is safe based on the monitoring data; and transmitting a command to the target device based on a result of the identification of the operation of the target device; and receiving location information regarding the plurality of robot devices, wherein the identifying the at least one first robot device as the target device further comprises, based on identifying a location of the at least one first robot device as being in a hazardous region based on hazardous region information and the location information, identifying the at least one first robot device, from among the plurality of robot devices, as the target device.

12. The method of claim 11, wherein the identifying the at least one first robot device as the target device further comprises, based on the operation of the at least one first robot device corresponding to a hazardous operation based on information related to the hazardous operation, identifying the at least one first robot device as the target device.

13. The method of claim 11, wherein the transmitting the command-further comprises transmitting an instruction causing the target device to stop the operation of the target device or to output a warning sound.

14. The method of claim 13, further comprising:

identifying the at least one second robot device based on identifying that the at least one second robot device is located within a threshold distance of the target device based on the location information.

15. The method as claimed in claim 11, wherein the monitoring data comprises at least one of photographic data of the target device, velocity data of the target device, or location data of the target device.

16. A system comprising:

an electronic device comprising:

a communication interface;

at least one memory storing one or more instructions; and one or more processors in communication with the at least one memory and configured to individually or collectively execute the one or more instructions; and a plurality of robot devices, wherein a robot device of the plurality of robot devices comprises at least one sensor, wherein the one or more instructions, when executed by the one or more processors individually or collectively, further cause the electronic device to:

receive, through the communication interface, operation information of the plurality of robot devices;

identify a first robot device from among the plurality of robot devices as a target device based on the operation information;

control, through the communication interface, at least one second robot device from among the plurality of robot devices to monitor the target device;

based on receiving monitoring data from the at least one second robot device through the communication interface:

identify whether an operation of the target device is safe based on the monitoring data; and transmit, through the communication interface, a command to the target device based on a result of the identification of the operation of the target device;

control, through the communication interface, the target device to monitor the at least one second robot device; and based on receiving first monitoring data from the target device through the communication interface:

identify whether an operation of the at least one second robot device is safe based on the first monitoring data, and transmit, through the communication interface, a command to the at least one second robot device.

17. The system of claim 16, wherein the at least one memory stores information related to a hazardous operation and hazardous region information corresponding to a space in which the plurality of robot devices are located, and wherein the one or more instructions, when executed by the one or more processors individually or collectively, further cause the electronic device to:

receive, through the communication interface, location information regarding the plurality of robot devices; and identify the first robot device as the target device based on: identifying the operation of the first robot device as comprising the hazardous operation based on the information related to the hazardous operation, or identifying a location of the first robot device as being in a hazardous region based on the hazardous region information and the location information.

18. The system of claim 16, wherein the one or more instructions, when executed by the one or more processors individually or collectively, further cause the electronic device to:

receive, through the communication interface, location information regarding the plurality of robot devices; and identify the at least one second robot device based on identifying that the at least one second robot device is located within a threshold distance of the target device based on the location information.

19. The system of claim 16, wherein the monitoring data comprises at least one of photographic data of the target device, velocity data of the target device, or location data of the target device.

20. The system of claim 19, wherein the operation information comprises, for a respective robot device of the plurality of robot devices, information regarding an operation of the respective robot device, information identifying whether the operation of the respective robot device is performed, and a traveling path of the respective robot device, and wherein the one or more instructions, when executed by the one or more processors individually or collectively, further cause the electronic device to:

identify the at least one second robot device based on identifying that the at least one second robot device is in an idle state based on the operation information;

transmit, through the communication interface, a command to the at least one second robot device which causes the at least one second robot device to follow the target device; and identify whether the operation of the target device is
safe based on the monitoring data.

\* \* \* \* \*